(12) United States Patent
Carbonera et al.

(10) Patent No.: US 8,085,266 B2
(45) Date of Patent: Dec. 27, 2011

(54) SYSTEM AND METHOD FOR SMOOTHING THREE DIMENSIONAL IMAGES

(75) Inventors: Carlos D. Carbonera, St. Paul, MN (US); Yuriy Malinin, Edina, MN (US)

(73) Assignee: Jostens, Inc., Minneapolis, MN (US)

( * ) Notice: Subject to any disclaimer, the term of this patent is extended or adjusted under 35 U.S.C. 154(b) by 0 days.

(21) Appl. No.: 11/109,496

(22) Filed: Apr. 19, 2005

(65) Prior Publication Data

US 2006/0001664 A1 Jan. 5, 2006

Related U.S. Application Data

(60) Provisional application No. 60/563,321, filed on Apr. 19, 2004.

(51) Int. Cl.
*G06T 15/00* (2011.01)
(52) U.S. Cl. .................................................... 345/420
(58) Field of Classification Search .................. 382/242, 382/256–258, 285, 199, 204; 345/424
See application file for complete search history.

(56) References Cited

U.S. PATENT DOCUMENTS

| | | | | | |
|---|---|---|---|---|---|
| 4,561,061 | A | * | 12/1985 | Sakamoto et al. | 382/242 |
| 4,630,309 | A | * | 12/1986 | Karow | 382/241 |
| 4,771,474 | A | * | 9/1988 | Takashima et al. | 382/241 |
| 4,918,611 | A | * | 4/1990 | Shyu et al. | 382/100 |
| 4,969,201 | A | * | 11/1990 | Takasaki et al. | 382/199 |
| 5,003,498 | A | * | 3/1991 | Ota et al. | 345/420 |
| 5,007,098 | A | * | 4/1991 | Kumagai | 382/185 |
| 5,116,174 | A | * | 5/1992 | Fried et al. | 409/79 |
| 5,369,736 | A | * | 11/1994 | Kato et al. | 345/582 |
| 5,473,742 | A | * | 12/1995 | Polyakov et al. | 345/442 |
| 5,544,291 | A |   | 8/1996 | Gilley et al. | |
| 5,548,698 | A |   | 8/1996 | Smith et al. | |
| 5,587,913 | A | * | 12/1996 | Abrams et al. | 700/119 |
| 5,649,079 | A | * | 7/1997 | Holmes | 345/423 |
| 5,689,577 | A | * | 11/1997 | Arata | 382/128 |
| 5,790,713 | A | * | 8/1998 | Kamada et al. | 382/285 |
| 5,850,222 | A | * | 12/1998 | Cone | 345/418 |
| 5,926,388 | A | * | 7/1999 | Kimbrough et al. | 700/118 |
| 6,085,126 | A | * | 7/2000 | Mellgren et al. | 700/233 |
| 6,101,280 | A | * | 8/2000 | Reynolds | 382/241 |

(Continued)

FOREIGN PATENT DOCUMENTS

WO   WO 00/57254   8/2000

(Continued)

OTHER PUBLICATIONS

"2004 Your Guide to Feature-based Manufacturing;" Jun. 2003; Engineering Geometry Systems; Tenth Edition; pp. 13-66, 153-182, 291-298, 311-342, 369-380, 441-457.*

(Continued)

*Primary Examiner* — Ulka Chauhan
*Assistant Examiner* — Andrew G Yang
(74) *Attorney, Agent, or Firm* — Dorsey & Whitney LLP (57) ABSTRACT

A method and system for converting two-dimensional artwork into three-dimensional models. Data relating to an image is imported and segments of the image are chained into contiguous curves. The contiguous curves together may form loops. Subsets of closed loops are split and created where surfaces of the image are to be created. The closed loops are contoured to create contours. The geometries created are projected onto a surface as an image. Finally, the image is smoothed.

16 Claims, 10 Drawing Sheets

U.S. PATENT DOCUMENTS

| | | | |
|---|---|---|---|
| 6,124,858 A * | 9/2000 | Ge et al. ........................ 345/619 |
| 6,181,839 B1 * | 1/2001 | Kannon et al. ................ 382/312 |
| 6,249,289 B1 * | 6/2001 | Arnaud et al. ................. 345/648 |
| 6,407,361 B1 * | 6/2002 | Williams ................. 219/121.69 |
| 6,434,277 B1 * | 8/2002 | Yamada et al. ............... 382/285 |
| 6,546,305 B1 * | 4/2003 | Hruby ........................... 700/117 |
| 6,600,488 B1 * | 7/2003 | Moreton et al. .............. 345/423 |
| 6,628,279 B1 * | 9/2003 | Schell et al. .................. 345/420 |
| 6,763,279 B2 * | 7/2004 | Davis ............................ 700/117 |
| 6,982,710 B2 * | 1/2006 | Salomie ........................ 345/420 |
| 7,091,963 B2 * | 8/2006 | Dresevic et al. .............. 345/173 |
| 7,236,180 B2 * | 6/2007 | Dresevic et al. .............. 345/592 |
| 7,747,055 B1 * | 6/2010 | Vining et al. ................. 382/131 |
| 2001/0044668 A1 * | 11/2001 | Kimbrough et al. .......... 700/118 |
| 2002/0085748 A1 * | 7/2002 | Baumberg ................... 382/154 |
| 2002/0113865 A1 | 8/2002 | Yano et al. |
| 2002/0128742 A1 * | 9/2002 | Zieverink ...................... 700/159 |
| 2002/0159638 A1 * | 10/2002 | Ratner et al. .................. 382/199 |
| 2002/0181802 A1 * | 12/2002 | Peterson ........................ 382/284 |
| 2002/0191863 A1 * | 12/2002 | Biermann et al. ............. 382/285 |
| 2004/0091143 A1 * | 5/2004 | Hu ................................. 382/154 |
| 2005/0089237 A1 * | 4/2005 | Park et al. ..................... 382/242 |
| 2005/0147312 A1 * | 7/2005 | Chen ............................. 382/242 |
| 2006/0290695 A1 * | 12/2006 | Salomie ........................ 345/420 |

FOREIGN PATENT DOCUMENTS

WO    2003-150666    5/2003

OTHER PUBLICATIONS

Sigmund, M. et al.; "Transformations between Pictures from 2D to 3D;" 2000; Journal of Intelligent and Robotic Systems; vol. 28; pp. 69-84.*

Patent Abstracts of Japan vol. 2003, No. 9, Sep. 3, 2003.

International Search Report (PCT/US2005/013469 (4 pgs.)), Sep. 6, 2005.

* cited by examiner

Contour area    Wire frame

FIG. 10

Tolerance band    Approximating poly-line    NURBS curve

SYSTEM AND METHOD FOR SMOOTHING THREE DIMENSIONAL IMAGES

FIELD OF THE INVENTION

This invention relates generally to a system and method for smoothing three-dimensional images, and more specifically to a system and method for smoothing three-dimensional images for use in the manufacturing of jewelry including rings.

BACKGROUND OF THE INVENTION

It is frequently necessary to convert a two-dimensional drawing into a three-dimensional figure. Such conversion requires aspects of mechanical modeling and artistry. However, many applications currently used to convert a two-dimensional drawing into a three-dimensional figure are static and rigid, providing little or no room for artistry. This can lead to unrealistic three-dimensional models. Further problems arise when the three-dimensional models are projected onto non-planar surfaces.

BRIEF SUMMARY OF THE INVENTION

The present invention relates to a system and method for smoothing figures. More specifically, the invention relates to a method and software implementing the method for advanced geometric modeling techniques to smooth figures.

The invention converts two-dimensional artwork into three-dimensional models while allowing the user/artist freedom in interpreting the artwork. In particular, the present invention supports both artistic and mechanical modeling techniques.

The method begins with importing data relating to the image. Segments of the image are chained into contiguous curves. The segments to be chained may be line segments. The contiguous curves together may form loops. Subsets of closed loops are split and created where surfaces of the image are to be created. These surfaces form closed loops may be referred to as contoured areas. Stated otherwise, segments of the image are connected to form loops and the closed loops are contoured to create contours. The closed loops are contoured to create contours. The geometries created are projected onto a surface as an image. In some embodiments, the geometries that have been contoured may be projected onto non-planar surfaces. Finally, the image is smoothed. This process, or individual steps therein, may be repeated as desired.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the drawings and detailed description are to be regarded as illustrative in nature and not restrictive.

DETAILED DESCRIPTION OF THE INVENTION

The present invention relates to a system and method for smoothing figures. More specifically, the invention relates to a method and associated software for advanced geometric modeling techniques to smooth figures for use in manufacturing jewelry.

The invention converts two-dimensional artwork into three-dimensional models while allowing the user/artist freedom in interpreting the artwork. In particular, the present invention supports both artistic and mechanical modeling techniques. Mechanical modeling techniques for converting a two-dimensional image to a three-dimensional model are typically static and rigid. The exact dimensions of features of a part are carefully calculated and may not be easily changeable. It is desirable that three-dimensional modeling techniques be both dynamic and flexible.

CAD artists generally focus on how a geometric object looks relative to the existing geometry. Transformations on geometric entities typically need to be fast; tens of translations and other transformations being performed per second on a large set of objects. It is desirable that three-dimensional modeling techniques display real time operations on geometric entities quickly. Stated otherwise, it is desirable that the results of modifications to surfaces and curves be displayed in real time. In that manner, the artist or user works on the relative positioning of a three-dimensional object in a part rather than on the exact positioning of the object.

In the past, multiple and various CAD/CAM packages have been used to generate three-dimensional artwork. In one embodiment, the present invention provides a unified CAD/CAM environment that is cross-functional and flexible.

Method

Figure 1:
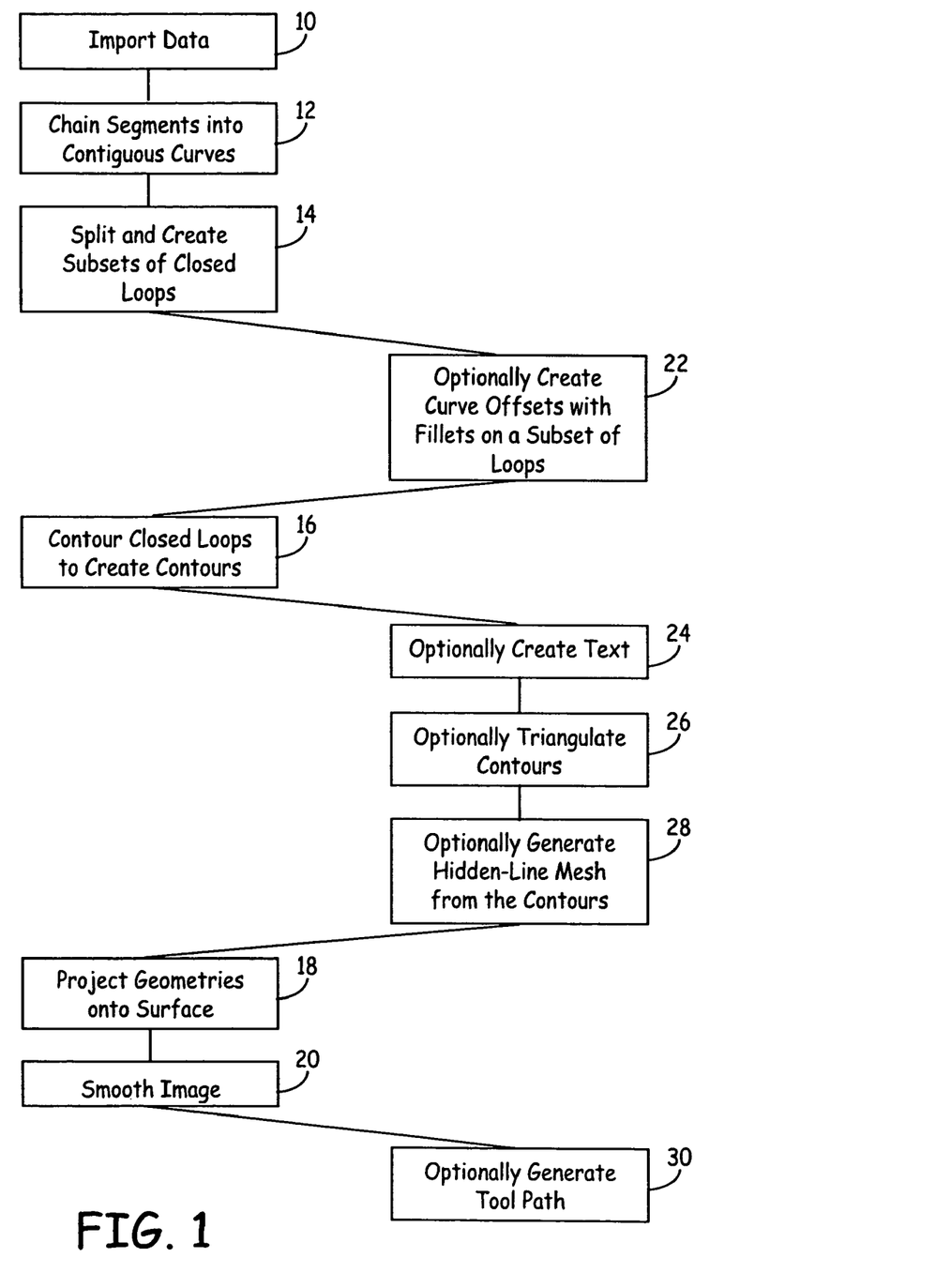
FIG. 1 is a flowchart of smoothing figures in accordance to one embodiment of the present invention.

FIG. 1 illustrates the steps of a method for smoothing three-dimensional figures in accordance with one embodiment of the present invention. The method includes several steps which may be repeated as necessary. Creating and editing curves provides a reasonable modeling technique is provided to artists.

The method begins with importing data relating to the image, shown at block 10. Segments of the image are chained into contiguous curves at block 12. The segments to be chained may be line segments. The contiguous curves together may form loops. Subsets of closed loops are split and created where surfaces of the image are to be created, shown at block 14. These surfaces form closed loops may be referred to as contoured areas. Stated otherwise, segments of the image are connected to form loops and the closed loops are contoured to create contours. The closed loops are contoured to create contours at block 16. The geometries created are projected onto a surface as an image, shown at block 18. In some embodiments, the geometries that have been contoured may be projected onto non-planar surfaces. Finally, the image is smoothed at block 20. This process, or individual steps therein, may be repeated as desired. As shown in FIG. 1, the method further includes several optional steps. These steps are described below.

The data imported relating to the image at block 10 may be a set of line segments and curves that together form an image. The image may be of any subject, for example, a lion's face, a football player, a mascot, or an architectural image. While the line segments and curves may be touching one another, they are typically not connected. In one embodiment, the data imported may be in dxf format from Corel draw in the UG environment. Alternately, the imported data may be IGES, Rapid Prototype or any other suitable format.

The segments and curves of the image imported are connected at block 12 to form contiguous curves. At block 14, the contiguous curves are split and subsets of closed loops are created. This may be thought of as curve chaining. In a specific embodiment, curve chaining is done using a function called "Join." To connect the segments and curves, the segments and curves to be joined are selected. Each segment is looped through to find matching end points and chains are constructed. This is typically done using a function of the computer program. The chains formed using the matching endpoints are loops—generally closed loops.

Data imported at block 10 is represented in lines and curves. In one embodiment, a program is provided that converts each curve to a local NonUniform Rational B-Spline (NURBS) format. Thus, the program converts the geometries imported at block 10 into NURBS geometries. The program then generates a union between the collection of segments.

The step of connecting segments may be performed multiple times to reduce the number of curves used.

Optionally, curve offsets may be created with fillets on a subset of loops, as shown at block 22 of FIG. 1. A fillet is an arc of a circle of a specified radius that replaces a portion of a curve. The fillet arc meets the curve at two points in a tangential manner.

Figure 2:
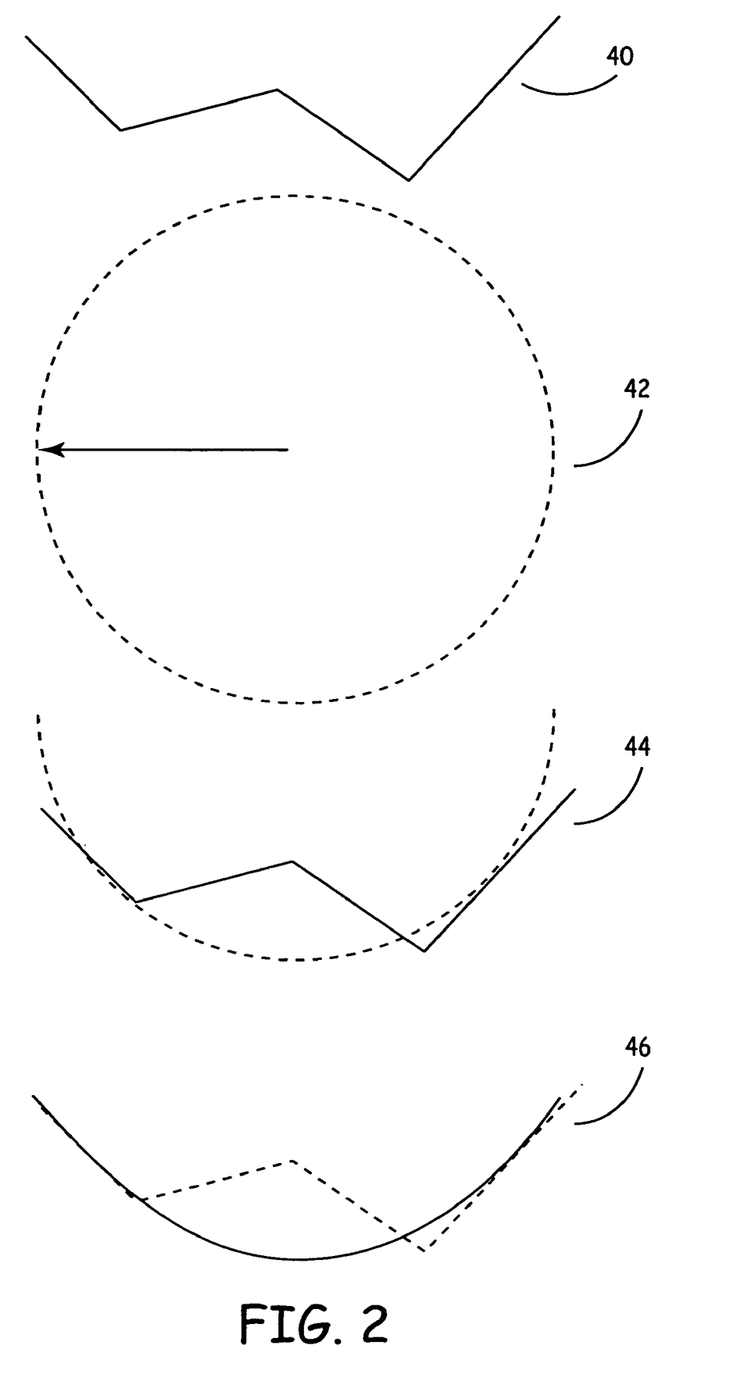
FIG. 2 illustrates fillet insertion.

The process of fillet insertion is illustrated at FIG. 2. As shown at block 40, initially the curve has sharp corners. A radius for the fillet is specified, shown at block 42. The portions of the curve where the fillet fits tangentially are determined, as shown at block 44. The fillet arc then replaces those portions of the curve, shown at block 46. Fillets may be used, for example, to reduce an offset distance of the curves. The curve offset process may be used in a hidden-line algorithm to generate an advance front offset. A particular embodiment of this, discussed more fully below, is used when the contours are triangulated.

After a series of loops are formed, the loops are contoured at block 16 of FIG. 1, thereby forming a set of contours. To contour a loop, it is desirable that the loop is closed. If the loop is not completely closed, it may be closed by hand, for example by using UG functionality. The contouring process is a form of dynamic modeling. Contour lines or contour areas are created from one of five basic shapes: spheres, cylinders, ellipsoids, cones or planes.

Figure 3:
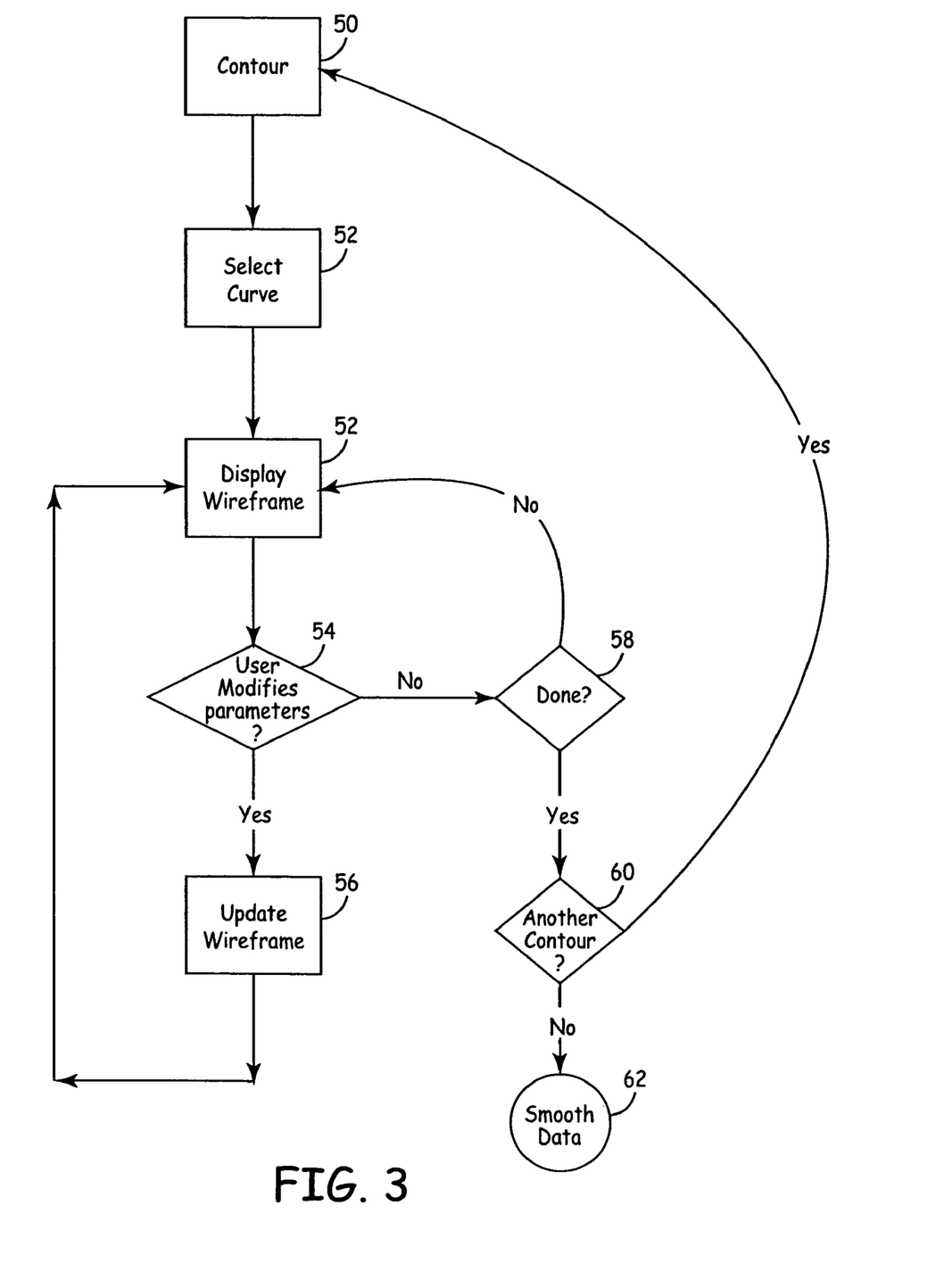
FIG. 3 is a flowchart of contouring curves in accordance to one embodiment of the present invention.

FIG. 3 illustrates a flow-chart of the contouring process. The process starts at block 50. A closed loop for contouring is selected at block 51. The interior is constructed at block 54. This involves crossing once on the inside and crossing twice on the outside. Thus, given a collection of closed loops, a point is set to be outside of the set of closed loops if there is an even number of intersections between the set of closed curves and any segment that connects the given point to infinity. In a specific embodiment, a contour dialog may be activated for the contouring process.

Figure 4:
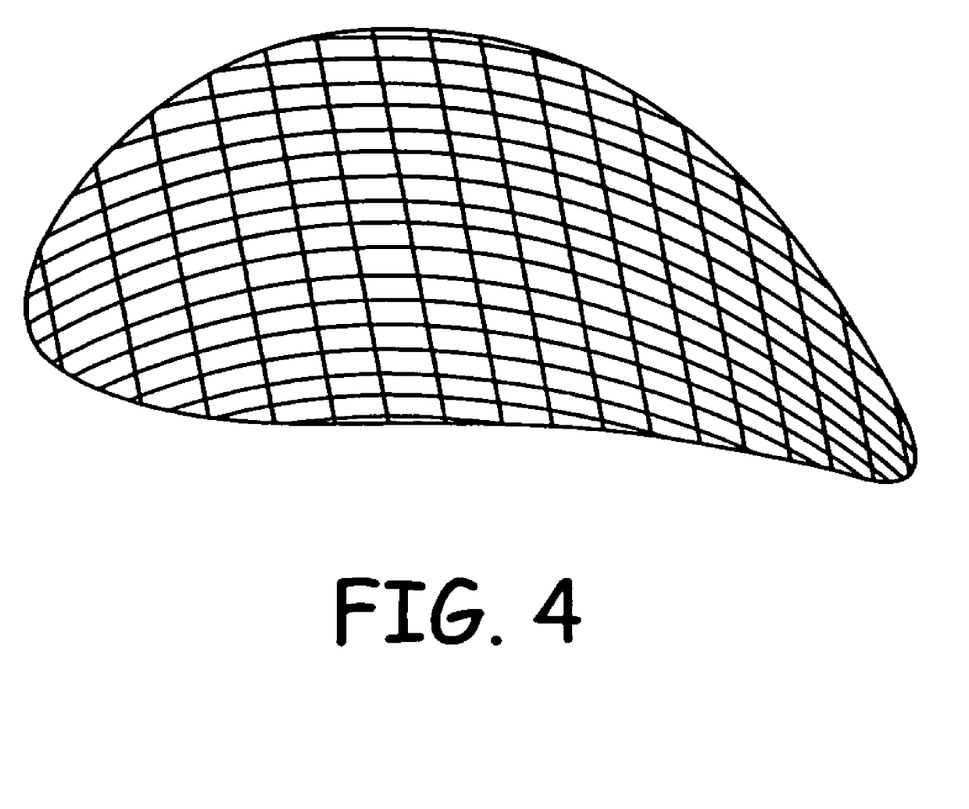
FIG. 4 illustrates a three-dimensional shape for dynamic modeling in accordance with one embodiment of the present invention.

Contouring involves dynamic modeling of a three-dimensional shape. FIG. 4 illustrates a three-dimensional shape 70 for dynamic modeling. The shape represents a three-dimensional trimmed surface that is modified through various parameters. As stated above, contour lines and contour areas are created from one of five basic shapes: spheres, cylinders, ellipsoids, cones or planes. Various parameters control each of these shapes and may be used to define the exact shape of the contoured areas.

Figure 5:
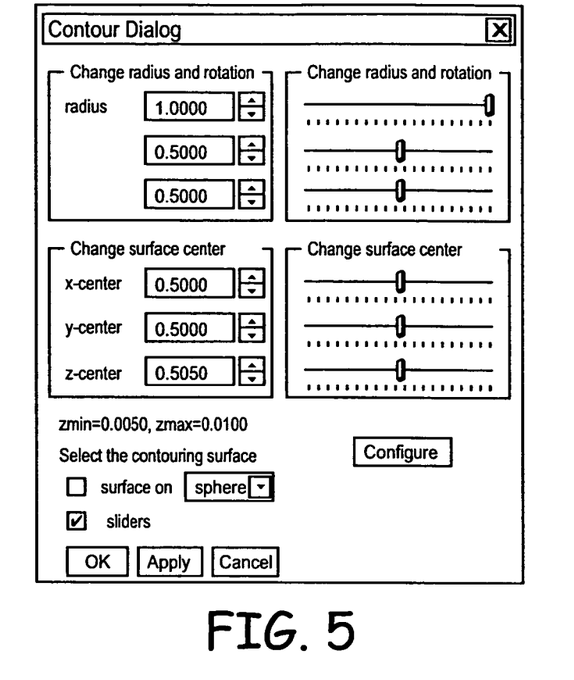
FIG. 5 illustrates a dialog box that may be used to control the parameters of a sphere in accordance with one embodiment of the present invention.
Figure 6:
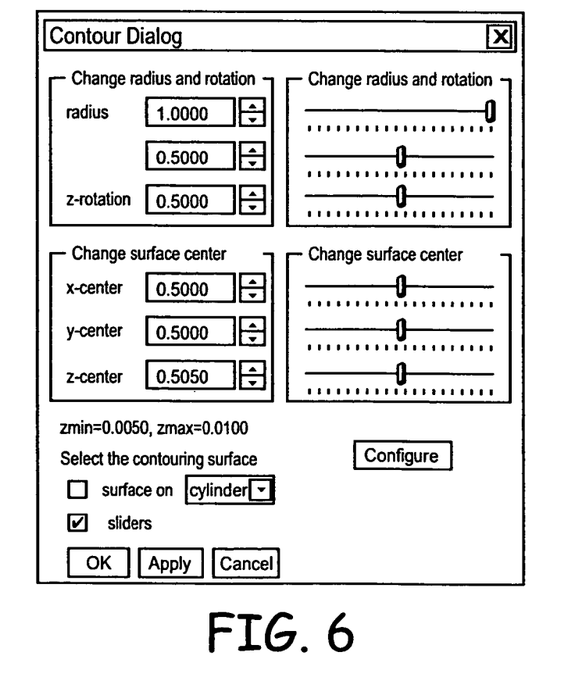
FIG. 6 illustrates a dialog box that may be used to control the parameters of a cylinder in accordance with one embodiment of the present invention.
Figure 7:
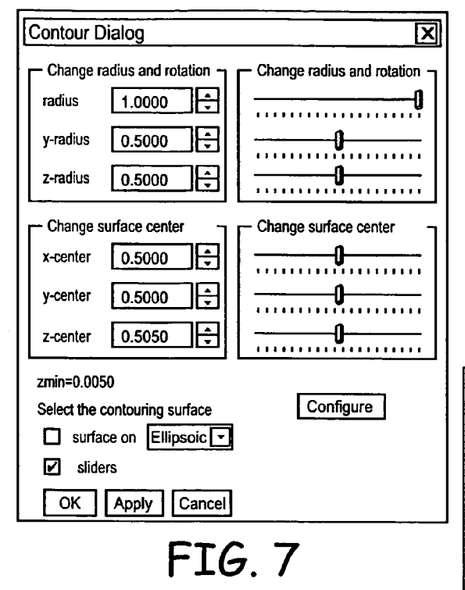
FIG. 7 illustrates a dialog box that may be used to control the parameters of an ellipsoid in accordance with one embodiment of the present invention.
Figure 8:
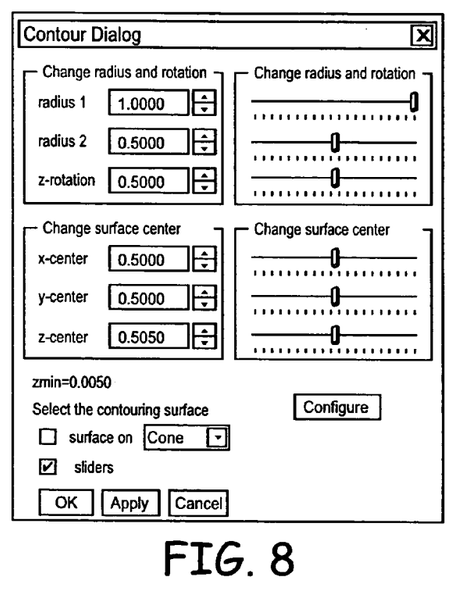
FIG. 8 illustrates a dialog box that may be used to control the parameters of a cone in accordance with one embodiment of the present invention.
Figure 9:
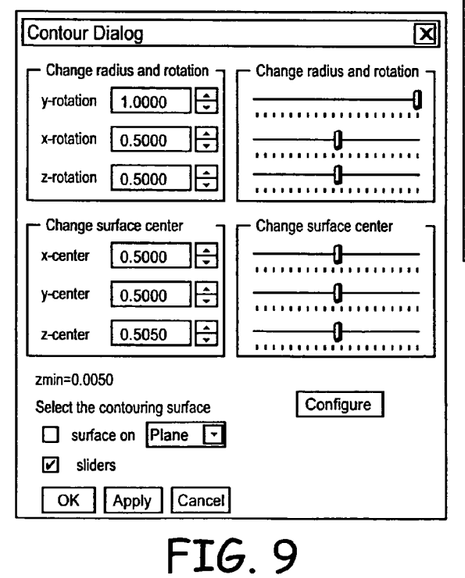
FIG. 9 illustrates a dialog box that may be used to control the parameters of a plane in accordance with one embodiment of the present invention.

The parameters that control a sphere are radius, center-x, center-y and center-z. FIG. 5 illustrates a dialog box that may be used to control the parameters of a sphere. The parameters that control a cylinder are radius of the cylinder, and x-, y- and z-center of the point used to define the location axis of symmetry of the cylinder. FIG. 6 illustrates a dialog box that may be used to control the parameters of a cylinder. The parameters that control an ellipsoids are x- and y-radii of the ellipsoid, rotation of the ellipsoid around the z-axis, and the x-, y- and z-center of the point used to define the location axis of symmetry of the ellipsoid. FIG. 7 illustrates a dialog box that may be used to control the parameters of an ellipsoid. The parameters that control the cone are two radii of the cone, rotation of the cone around the z-axis and x-, y- and z-center of the point used to define the location axis of symmetry of the cone. FIG. 8 illustrates a dialog box that may be used to control the parameters of a cone. The parameters that control a plane are the x-, y- and z-rotations of the normal to the plane, and x-, y- and z-center of the point used to define the location of the plane. FIG. 9 illustrates a dialog box that may be used to control the parameters of a plane.

It may be desirable to modify or change the parameters, for example, for the amount of rotation for each shape. The parameters may be modified at block 54. As shown in FIGS. 5-9, the value of each parameter may be controlled by a slide bar. After the parameters are updated, the wireframe is updated at block 56. The contouring process then returns to block 52 where the updated wireframe is displayed. If desired, the parameters of the updated wireframe may be modified at block 54. If modified, the loop of blocks 52-54-56 is repeated. If the parameters are not modified, the contouring process proceeds to block 58 where it is determined of the contouring of the selected curve is complete. If not, the contouring process returns to block 52. If the contouring process for the selected curve is complete, at block 60 the user may select to proceed with another contour. If another contour is to be performed, the process returns to block 48 where the contour is initiated. If no further contours are to be performed, the method of the present invention proceeds generally towards smoothing the data, represented by block 62.

Figure 10:
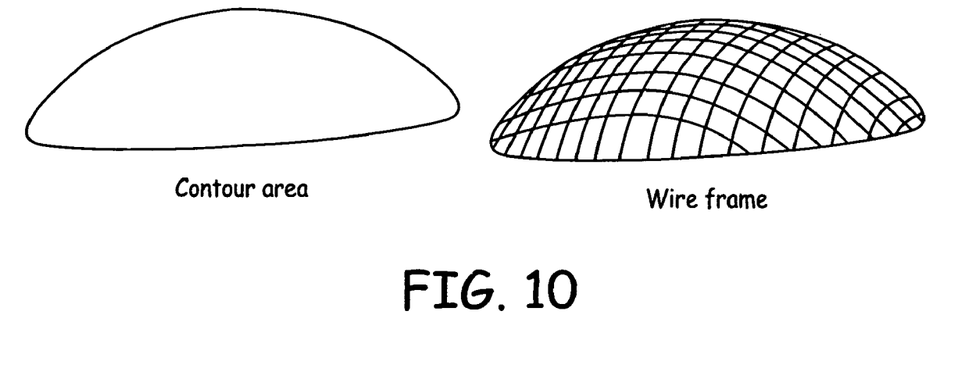
FIG. 10 illustrates a contour area and a wireframe of the contour area.

Returning to FIG. 3, after selection of the curve for contouring, a wireframe or grid may be displayed approximately over the surface at block 52. A hidden-line algorithm may be used to generate a uniform mesh that approximates the collection of contoured objects. The hidden-line algorithm uses the curve offset process and a projection process. In the projection process, the geometries that have been contoured are projected on the set of contour areas. This mesh is used to smooth the geometries and create organic shapes. Generally, translations and dynamic modifications of contour area surfaces are required an amount of time to update the display of a contour area after its parameters have been modified such that it is impractical to perform dynamic displays. To improve the performance and be able to understand the effect of modifying the basic shape of surfaces through changes in the parameters, an approximation of the contour area through curves that conform to the contour area shape may be displayed. These curves conform to the shape of the contour area and may be referred to as wireframes. FIG. 10 illustrates a contour area and a wireframe of the contour area.

Optionally, text may be added to the image, shown at block 24 of FIG. 1. For example, text may be created using a text mapping functionality. In a specific embodiment, text is created using a text mapping functionality in Next-Gen JDS.

Figure 11:
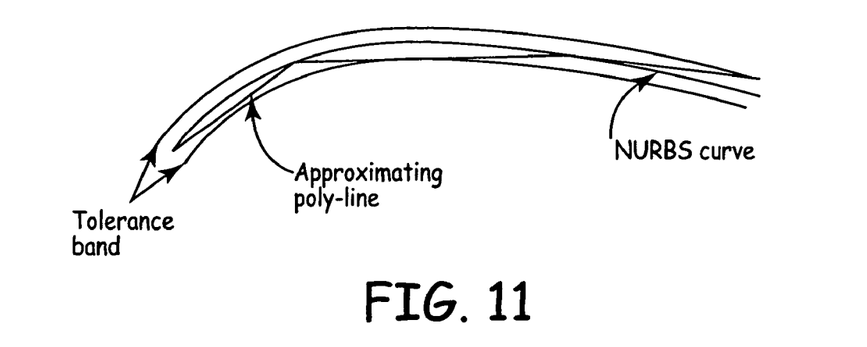
FIG. 11 illustrates an exemplary spline and approximation to the given tolerance.

If desired, or as called for by particular images, the contours may be triangulated, shown at block 26 of FIG. 1. To triangulate the contours, the curves from the contour are selected. The curves are then offset by a uniform distance. The offset distance may be predetermined or may be determined via trial and error. If the initial offset is too large, the offset is reduced and fillets are added. In one embodiment, to create the curve offsets, a C++ API (discussed below) to a third party library is created to extract curve data provided by UGOPEN. The curve data is discretized to a given tolerance by a collection of poly-segments. FIG. 11 illustrates an exemplary spline and approximation to the given tolerance. The resulting entities are created as degree-1 Splines-by-poles and fed to a curve offset engine.

Figure 12:
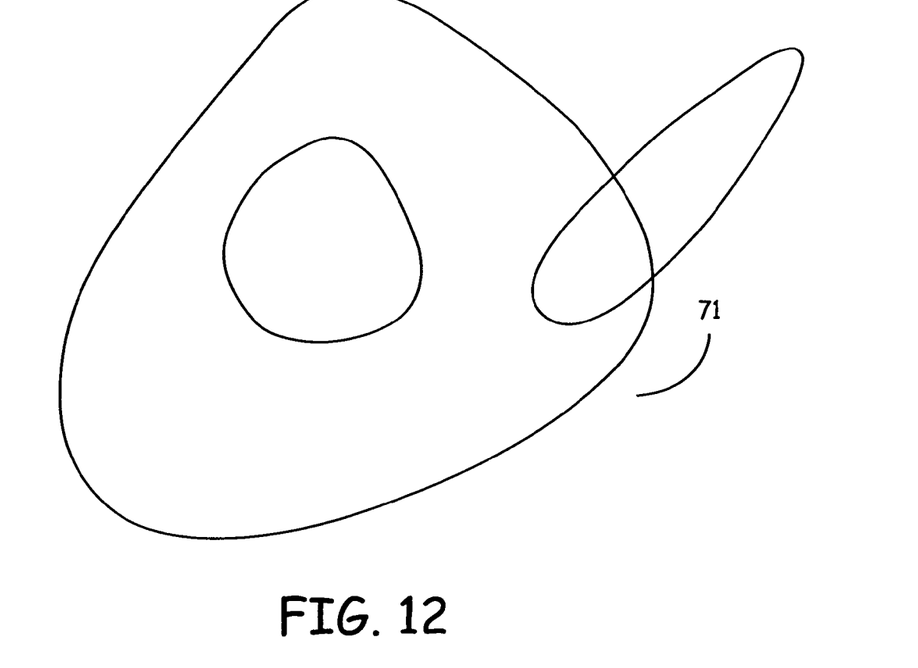
FIG. 12 illustrates exemplary curves for triangulation in accordance with one embodiment of the present invention.
Figure 13:
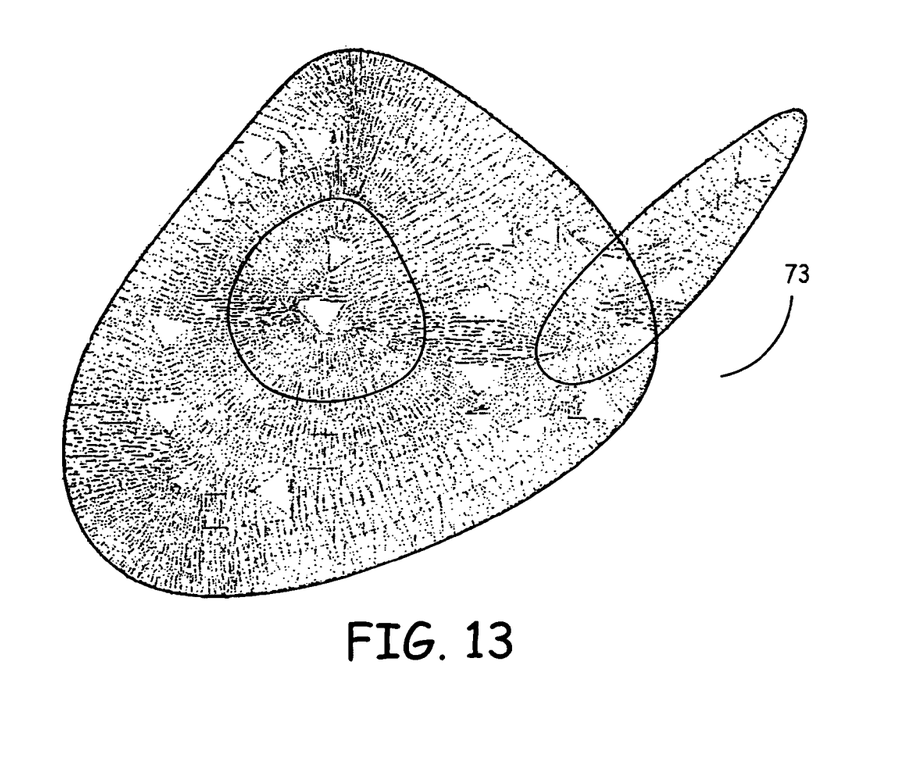
FIG. 13 illustrates the exemplary curves of FIG. 12 after triangulation in accordance with one embodiment of the present invention.

FIG. 12 illustrates exemplary curves 71 for an advancing front triangulation. Generally, advancing front techniques are used to generate triangulations. API calls to a library such as a third party library may be used to generate an advancing front triangulation. Triangles are created between each offset and the collection of triangles is the triangulation. The resulting triangulation 72, shown in FIG. 13 conforms to the input curves. Intersections are resolved automatically. For example, intersections may be resolved by performing segment-segment intersections and splitting segments at their intersecting points as needed.

Returning to FIG. 1, a hidden-line mesh may optionally be generated, shown at block 28, from the contours using the hidden-line algorithm.

Figure 14:
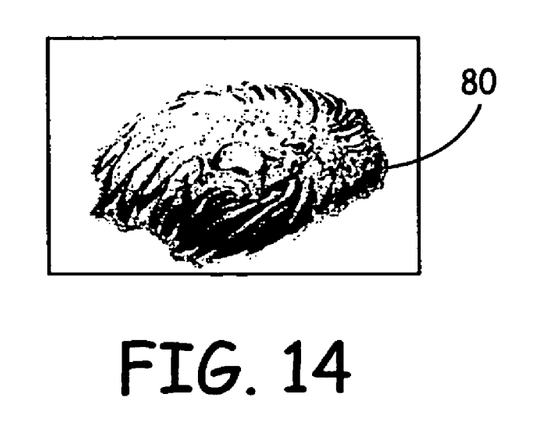
FIG. 14 illustrates a three-dimensional image.
Figure 15:
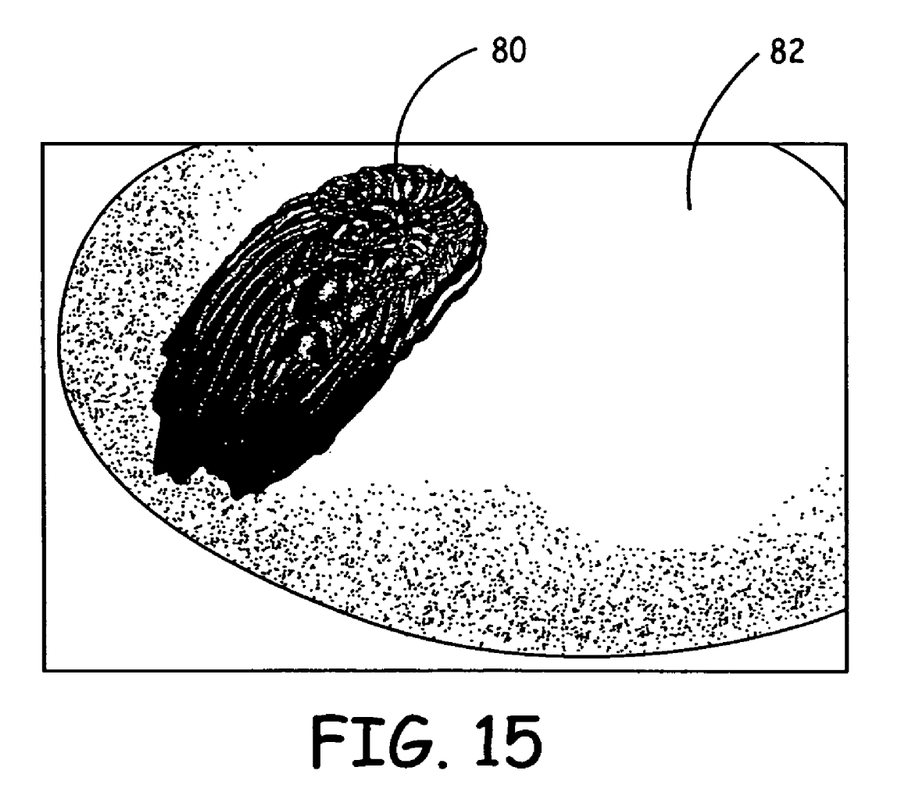
FIG. 15 illustrates the three-dimensional image of FIG. 14 projected onto a spherical dome in accordance with one embodiment of the present invention.

The geometries that have been contoured are projected onto a surface, shown at block 18 of FIG. 1. For example, if the image is to be used on a ring, the geometries are projected onto a surface that represents the shank of the ring. If the figure has been triangulated, this involves projecting the vertices of the contours onto the surface. This enables the image to be projected onto the surface. For example, FIG. 14 illustrates a three-dimensional image 80 and FIG. 15 illustrates the same three-dimensional image 80 projected onto a spherical dome 82.

Smoothing of the image is performed at block 20 of FIG. 1 and block 72 of FIG. 3. To smooth the image, the centroid of each of the triangles formed is selected. A vertex is chosen and, for each triangle that contains the vertex, the centers are averaged. For the purposes of smoothing, the center is the average of three vertices. This process is repeated for a fixed number of iterations, for example, ten to fifteen.

Additional techniques may be used for the creation of organic soft-features. For example, in an image having walls transitioning from an upper contour to a lower contour, a slight slant can be noted on these walls. One technique involves adding more slant to the walls by specifying an angle at which the walls would be tilted. Any technique permitting recontouring of portions of the mesh by drawing a closed curve around the section of the mesh and redoing the contour locally may be used. In such techniques, the smoothing algorithm operates at a neighborhood of the new recontoured sections of the mesh.

The method may be used for generating an image for engraving on a piece of jewelry, for example a ring. In such usage, a tool path may be generated for the engraving. Thus, as shown at block 30 of FIG. 1, a tool path may generated on the projected geometries. If the geometry is a contour area, the tool path is crated as a raster tool path. If the geometry is a contour curve, the tool path is a contour curve.

Software

A particular embodiment of software is provided for implementing the method for smoothing images of the present invention. However, any suitable software may be used to implement the method.

In one embodiment, the software, UGOPEN, has base UG functionality which provides basic CAD operations. The software supports NURBS trimmed surfaces and Facetted Model entities as well as provides an integrated CAM environment. A functional graphical user interface (GUI) may be provided to support additional enhancements through the UGOPEN application programming interface (API). Specific functionality may be implemented with UGOPEN/Third Party Libraries/Proprietary code.

Figure 16:
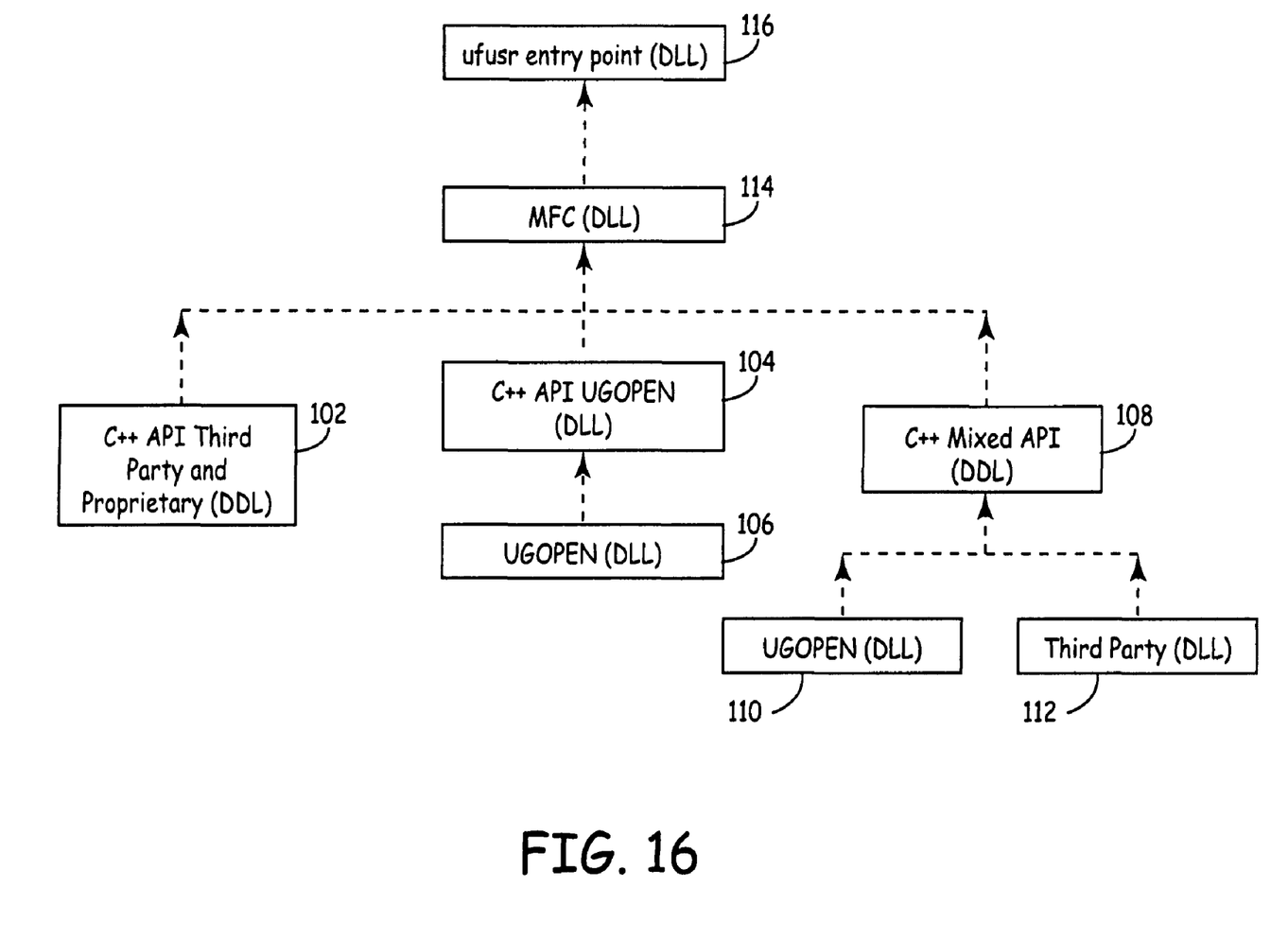
FIG. 16 is a diagram of the high level architecture of one embodiment of software implementing the method of the present invention.

FIG. 16 illustrates a first embodiment of the high-level architecture of the software of the present invention. Various functionality is separated into functional libraries. Five layers are provided. The first layer is a Unigraphics NX Wizard providing entry and exit functions (ufusr and ufsta). The second layer is a Microsoft Foundation Classes (MFC)-based interface. The third layer is a wrapper to UG-specific and general libraries. The fourth layer comprises UG-specific libraries with UG-provided UG-specific user interface (for example, "Select" interface). The fifth layer comprises Geometry libraries.

A wizard is provided for graphics control. The wizard generates a standard MFC-based dynamic link library (DLL) without any OpenUG functionality. From this layer, a wrapper is called to OpenUG and general purpose geometry libraries In some embodiments, such wrapper may be omitted.

As shown in FIG. 16, in the specific embodiment, three application programming interfaces (APIs) are provided. The first API is C++ API Third Party and Proprietary (DLL) 100. The second API is C++ API UGOPEN (DLL) 102. This API 102 is built on core UGOPEN functions 104. The third API is C++ Mixed API (DLL) 106. This API 106 is built on core UGOPEN functions 108 and third party functions 110. More or fewer APIs may be provided in other embodiments.

In the embodiment shown, five types of libraries are used. These include proprietary source developed in C++, an API written in C++ built on core UGOPEN functions, third party libraries that handle NURBS and triangular data, libraries that use MFC modeless dialog boxes, and libraries that mix UGOPEN with other libraries. The specific libraries provided may vary. All of the libraries generated may be custom to the software for implementing the method for smoothing images. Alternately, in the embodiment here described, third party libraries may be used as available. By utilizing multiple libraries, the code is easy to maintain and functionality may easily be added.

The C++ API Third Party and Proprietary 102, the C++ API UGOPEN 104, and the C++ Mixed API 108 together are accessible vie MFC dialog boxes 114. The MFC dialog boxes 114 may be accessed via a ufusr entry point 116. In one embodiment, the MFC dialog boxes 114 are supported through Visual C++.

In a specific embodiment, the UGOPEN functionality is encapsulated. An API is provided to access UGOPEN functions calls. Thus, modules that call on UGOPEN functionality may be written through the API. The API encapsulates the UGOPEN calls. The software includes classes supporting basic UG Calls. For example, UGSurface, UGCurve, and UGLock. Of course, other classes may be provided.

Graphics operators using the software of the embodiment described are provided with keyboard functionality to speed creation of 3D models. This is done by providing a control class that generically inherits from a not yet defined existing control. Inheriting from existing Windows controls (edit control, spin control, button control, slider control, combobox control, etc.) allows to compactly re-implement the existing Windows control with the functionality to process keyboard events.

In a specific embodiment, curve chaining, as at block 12 of FIG. 1, is done using a function of the software called "Join." The segments and curves to be joined are selected, each segment is looped through to find matching end points and chains are constructed. Phrased otherwise, a collection of segments to be joined are selected, UGOPEN converts each curve to a local NURBS format, and UGOPEN generates a union between the collection of segments.

The software may provide various dialogs for aiding user control. For example, a contour dialog for contouring loops (block 16 of FIG. 1). UGOPEN makes it easy for a user to associate data related to its creation to the entity tags. Attributes on the trimmed surface entity store the parameters used to generate the surface. These parameters may be read by an editing function (discussed below) that permits the user to further modify the geometry.

To create curve offsets, for triangulation of the contours, as in block 16 of FIG. 1, the C++ API to a third party library 102 extracts curve data provided by UGOPEN. The curve data is discretized to a given tolerance. As discussed above, the curve data is discretized to a given tolerance by a collection of poly-segments. A library, such as TSLIB.DLL, may be used to approximate NURBS curves by poly-segments to a given tolerance. The resulting entities are created as degree-1 Splines-by-poles and fed to a curve offset engine. The resulting entities are created as degree-1 Splines-by-poles and fed to a curve offset engine. One of the APIs 102 or 108 calls to a library such as a third party library to generate an advancing front triangulation.

Software, such as UGOPEN, implementing the method for smoothing images provides clean interfaces for the creation and editing of facetted-models. Further, scaling and translation of facetted-models is possible. The triangles belonging to a particular facetted-model may be accessed independently and edited.

Although the present invention has been described with reference to preferred embodiments, persons skilled in the art will recognize that changes may be made in form and detail without departing from the spirit and scope of the invention.

What is claimed is:

1. A method of creating a three-dimensional image, comprising:
   importing data relating to a two-dimensional image;
   chaining segments of the image into contiguous curves;
   forming loops from the contiguous curves;
   creating at least one subset of loops;
   contouring the at least one subset of loops to form a contoured area, wherein contouring comprises modifying at least one of amount of rotation, radius, or surface center;
   triangulating the contoured area, wherein triangulating the contoured area comprises selecting curves from the contoured area, offsetting the curves by a uniform distance and creating triangles between the offsets;
   generating a hidden-line mesh to approximate the contoured area;
   projecting geometries of the contoured area onto a surface using the hidden-line mesh, wherein projecting the geometries comprises projecting the vertices of the triangulated contoured area;
   smoothing the image, wherein smoothing the image comprises recontouring portions of the mesh by drawing a closed curve around the portion of the mesh and redoing the contour locally.

2. The method of claim 1, wherein the data is a collection of line segments and curves that together form the image.

3. The method of claim 1, wherein the chaining of segments into contiguous curves is done by finding matching endpoints and constructing chains using the endpoints.

4. The method of claim 1, further comprising repeating chaining segments to reduce the number of contiguous curves.

5. The method of claim 1, wherein the data imported is in dxf format.

6. The method of claim 1, wherein the at least one subset is created where a surface of the three-dimensional image is to be created.

7. The method of claim 1, further comprising creating curve offsets on at least one subset of loops.

8. The method of claim 7, wherein creating curve offsets is performed by inserting a fillet within the curve.

9. The method of claim 1, wherein contouring the at least one subset of loops is done with dynamic modeling.

10. The method of claim 9, wherein the dynamic modeling involves creating the contour area from a shape.

11. The method of claim 10, wherein the shape is a sphere, cylinder, ellipsoid, cone or plane.

12. The method of claim 10, further comprising changing parameters of the shape.

13. The method of claim 12, further comprising generating a wireframe over the image to show changes in the parameters.

14. The method of claim 1, further comprising adding text to the image.

15. The method of claim 1, wherein the geometries of the contoured area are projected onto a surface representing a shank of a ring.

16. The method of claim 1, further comprising generating a tool path.

* * * * *